(12) United States Patent
Wnek (10) Patent No.: US 9,457,509 B2
(45) Date of Patent: Oct. 4, 2016

(54) TOOL FOR FORMING A THREE DIMENSIONAL ARTICLE OR CONTAINER

(75) Inventor: Patrick H. Wnek, Sherwood, WI (US)

(73) Assignee: Graphic Packaging International, Inc., Atlanta, GA (US)

( * ) Notice: Subject to any disclaimer, the term of this patent is extended or adjusted under 35 U.S.C. 154(b) by 842 days.

(21) Appl. No.: 13/606,385

(22) Filed: Sep. 7, 2012

(65) Prior Publication Data
US 2013/0064998 A1 Mar. 14, 2013

Related U.S. Application Data

(60) Provisional application No. 61/573,647, filed on Sep. 9, 2011.

(51) Int. Cl.
| | | |
|---|---|---|
| B29C 51/32 | (2006.01) | |
| B21D 22/26 | (2006.01) | |
| B21D 51/18 | (2006.01) | |

(Continued)

(52) U.S. Cl.
CPC ............ B29C 51/325 (2013.01); B21D 22/26 (2013.01); B21D 51/18 (2013.01); B29C 51/087 (2013.01); B29D 22/003 (2013.01); B21D 51/263 (2013.01); B21D 51/30 (2013.01); B21D 51/34 (2013.01); B29C 51/306 (2013.01); B29L 2031/712 (2013.01); B29L 2031/7132 (2013.01);

(Continued)

(58) Field of Classification Search
CPC ...... B21D 51/18; B21D 51/16; B21D 22/06; B21D 22/26; B21D 22/22; B21D 22/30; B21D 24/16; B21D 51/263; B21D 51/2615; B21D 51/2623; B21D 51/2684; B21D 51/30; B21D 51/34; B21D 51/2646

USPC .......... 72/349, 353.2, 354.6, 356, 357, 358, 72/359, 348, 379.4

See application file for complete search history.

(56) References Cited

U.S. PATENT DOCUMENTS

| | | | |
|---|---|---|---|
| 1,022,862 | A | 4/1912 | Schwenn |
| 3,033,434 | A | 5/1962 | Carson |

(Continued)

FOREIGN PATENT DOCUMENTS

| | | |
|---|---|---|
| DE | 509 065 | 4/1969 |
| DE | 80 11 020 | 9/1980 |

(Continued)

OTHER PUBLICATIONS

International Search Report and Written Opinion for related application No. PCT/US2012/054104, mailed Feb. 26, 2013.

(Continued)

*Primary Examiner* — Shelley Self
*Assistant Examiner* — Gregory Swiatocha
(74) *Attorney, Agent, or Firm* — Womble Carlyle Sandridge & Rice, LLP (57) ABSTRACT

A tool for forming a container from a blank. The container can include a flange. The tool has a first tool assembly, and a second tool assembly. At least one of the first tool assembly and the second tool assembly can be moveable between an open position, wherein the blank is received between the first tool assembly and the second tool assembly, and a closed position wherein the blank is formed into the container. At least one of the first tool assembly and the second tool assembly has flange forming features for forming the flange of the container whereby a first portion of the flange is folded with respect to a second portion of the flange.

22 Claims, 9 Drawing Sheets

(51) Int. Cl.
  *B29D 22/00* (2006.01)
  *B29C 51/08* (2006.01)
  *B29L 31/00* (2006.01)
  *B29C 51/30* (2006.01)
  *B21D 51/26* (2006.01)
  *B21D 51/30* (2006.01)
  *B21D 51/34* (2006.01)

(52) U.S. Cl.
  CPC ......... *B31B 2201/223* (2013.01); *Y10T 428/13* (2015.01)

(56) References Cited

U.S. PATENT DOCUMENTS

| | | | |
|---|---|---|---|
| 3,195,770 A | 7/1965 | Robertson | |
| 3,220,631 A | 11/1965 | Reifers | |
| 3,229,886 A | 1/1966 | Grogel | |
| 3,496,896 A * | 2/1970 | Smith | 72/348 |
| 3,530,917 A | 9/1970 | Donovan | |
| 3,669,305 A | 6/1972 | Kinney et al. | |
| 3,850,340 A | 11/1974 | Siemonsen et al. | |
| 3,871,314 A * | 3/1975 | Stargell | 413/13 |
| 3,968,921 A | 7/1976 | Jewell | |
| 4,051,707 A | 10/1977 | Valek et al. | |
| 4,096,947 A | 6/1978 | Morse | |
| 4,202,464 A | 5/1980 | Mohs et al. | |
| 4,372,720 A * | 2/1983 | Herdzina et al. | 413/56 |
| 4,721,499 A | 1/1988 | Marx et al. | |
| 4,795,045 A * | 1/1989 | Radtke | 215/325 |
| 4,967,908 A | 11/1990 | Kessler | |
| 5,617,972 A | 4/1997 | Morano et al. | |
| 5,782,376 A | 7/1998 | Brauner et al. | |
| 5,904,643 A | 5/1999 | Seeberger et al. | |
| 5,938,112 A | 8/1999 | Sandstrom | |
| 6,083,449 A | 7/2000 | Rees | |
| 6,093,460 A | 7/2000 | Iwaya | |
| 6,213,301 B1 | 4/2001 | Landis et al. | |
| 6,325,213 B1 | 12/2001 | Landis, II | |
| 6,415,945 B1 | 7/2002 | Zank et al. | |
| 6,568,534 B2 | 5/2003 | Zank | |
| 7,975,871 B2 | 7/2011 | Wnek et al. | |
| 8,252,217 B2 | 8/2012 | Wnek et al. | |
| 2002/0092791 A1 | 7/2002 | Wnek | |
| 2003/0205319 A1 | 11/2003 | Bengtsson et al. | |
| 2004/0069788 A1* | 4/2004 | Johns et al. | 220/575 |
| 2005/0044920 A1* | 3/2005 | McClung | 72/348 |
| 2007/0267374 A1 | 11/2007 | Middleton et al. | |
| 2009/0223952 A1 | 9/2009 | Wnek et al. | |
| 2009/0250372 A1 | 10/2009 | Wnek et al. | |
| 2010/0314801 A1* | 12/2010 | O'Hagan et al. | 264/325 |
| 2010/0323864 A1 | 12/2010 | Wnek | |
| 2011/0062050 A1 | 3/2011 | Wnek | |
| 2011/0272317 A1 | 11/2011 | Wnek et al. | |
| 2012/0118880 A1 | 5/2012 | Wnek | |
| 2012/0292813 A1 | 11/2012 | Middleton et al. | |

FOREIGN PATENT DOCUMENTS

| | | |
|---|---|---|
| DE | 87 13 290.7 | 1/1988 |
| DE | 37 37 052 A1 | 5/1989 |
| DE | 296 02 348 | 5/1996 |
| DE | 101 49 142 A1 | 4/2003 |
| EP | 0515562 | 8/1991 |
| FR | 2 266 638 | 10/1975 |
| FR | 2 599 002 | 11/1987 |
| GB | 1 264 484 | 2/1972 |
| GB | 1 376 603 | 12/1974 |
| JP | 59-41237 | 3/1984 |
| JP | 3031361 | 9/1996 |
| JP | 8-337234 | 12/1996 |
| JP | 2000-517260 | 12/2000 |
| JP | 2007-510598 | 4/2007 |
| WO | WO96/11142 | 4/1996 |
| WO | WO98/09812 | 3/1998 |
| WO | WO03/078012 | 9/2003 |
| WO | WO 2005/047126 A2 | 5/2005 |

OTHER PUBLICATIONS

EP Search Report for EP 10011372.9, dated Feb. 1, 2011.
Office Action dated Sep. 6, 2010 from JP Appln No. 2006-539886 and partial English translation.
Notification of Reason for Refusal for JP 2014-529884 dated May 19, 2015.

* cited by examiner

TOOL FOR FORMING A THREE DIMENSIONAL ARTICLE OR CONTAINER

CROSS-REFERENCE TO RELATED APPLICATIONS

This application claims the benefit of U.S. Provisional Patent Application No. 61/573,647, filed Sep. 9, 2011.

INCORPORATION BY REFERENCE

The disclosures of U.S. Provisional Patent Application No. 61/573,647, which was filed on Sep. 9, 2011, U.S. patent application Ser. No. 12/425,417, which was filed on Apr. 17, 2009, International Application No. PCT/US/2007/081743, which was filed on Oct. 18, 2007, and U.S. Provisional Patent Application No. 60/829,976, which was filed on Oct. 18, 2006, are incorporated by reference as if presented herein in their entirety.

BACKGROUND OF THE DISCLOSURE

The present disclosure relates to tools and methods for forming materials into articles, elements or containers that may be used to hold, contain, or prepare food products or other products.

SUMMARY OF THE DISCLOSURE

In one aspect, the disclosure is generally directed to a tool for forming a container having a flange. The tool has features that form or roll at least a portion of the flange.

In another aspect, the disclosure is generally directed to a tool for forming a container from a blank. The container can include a flange. The tool comprises a first tool assembly, and a second tool assembly. At least one of the first tool assembly and the second tool assembly can be moveable between an open position, wherein the blank is received between the first tool assembly and the second tool assembly, and a closed position wherein the blank is formed into the container. At least one of the first tool assembly and the second tool assembly can comprise flange forming features for forming the flange of the container whereby a first portion of the flange is folded with respect to a second portion of the flange.

In another aspect, the disclosure is generally directed to a method of forming a container from a blank. The method comprises obtaining a tool and the blank. The tool can comprise a first tool assembly and a second tool assembly, and at least one of the first tool assembly and the second tool assembly can comprise flange forming features for forming a flange of the container. The method can further comprise pressing the blank between the first tool assembly and the second tool assembly to form the blank into the container having an interior and actuating the flange forming features for forming the flange of the container by at least partially folding a first portion of the flange with respect to a second portion of the flange.

In another aspect, the disclosure is generally directed to a container formed from any of the various methods as shown and/or described herein.

Those skilled in the art will appreciate the above stated advantages and other advantages and benefits of various additional embodiments reading the following detailed description of the embodiments with reference to the below-listed drawing figures.

According to common practice, the various features of the drawings discussed below are not necessarily drawn to scale. Dimensions of various features and elements in the drawings may be expanded or reduced to more clearly illustrate the embodiments of the disclosure.

BRIEF DESCRIPTION OF THE DRAWINGS

Corresponding parts are designated by corresponding reference numbers throughout the drawings.

DETAILED DESCRIPTION OF THE EXEMPLARY EMBODIMENTS

The present disclosure relates generally to various aspects of materials, packages, elements, articles, containers, and methods of making such materials, packages, elements, articles, and containers. Although several different aspects, implementations, and embodiments of the disclosure are provided, numerous interrelationships between, combinations thereof, and modifications of the various inventions, aspects, implementations, and embodiments of the disclosure are contemplated hereby. In one illustrated embodiment, the present disclosure relates to forming a container for holding, heating, and/or cooking one or more food items. The container may be suitable for cooking the food item or items in a microwave oven. However, in other embodiments, the disclosure can be used to form articles or containers not used for microwave cooking.

Figure 1A:
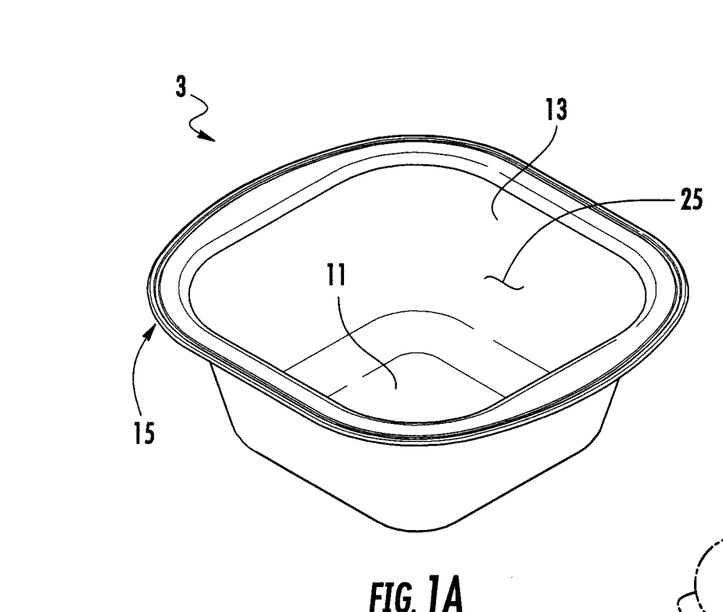
FIG. 1A is an isometric view of a container formed from a forming tool according to an exemplary embodiment of the disclosure.
Figure 1B:
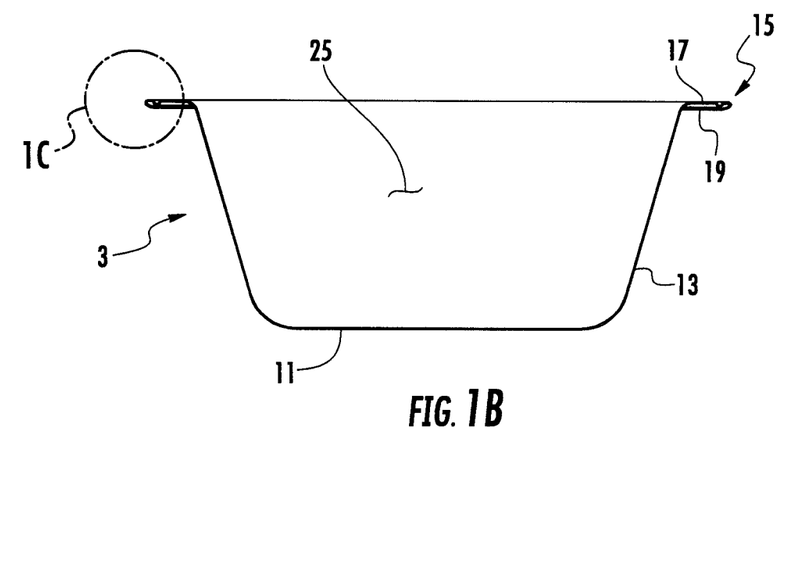
FIG. 1B is a cross-sectional view of the container of FIG. 1A.

FIGS. 1A and 1B show a container 3 for holding a food product (not shown). The construct or container 3 is formed from a generally flat blank 5 (FIG. 2) that is pressed in a forming tool 7. In one embodiment, the blank 2 can have one or more layers of microwave interactive material (not shown). Alternatively, the blank 2 can be free of microwave interactive material.

Figure 1C:
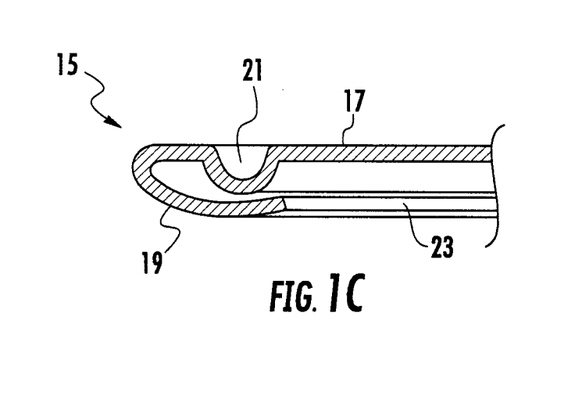
FIG. 1C is a detail view of a flange of the cross-section of the container of FIG. 1B.

As shown in FIGS. 1A and 1B, the container 3 has a bottom wall 11, an upstanding side wall 13, and a flange 15 at the top of the side wall. As shown in FIG. 1C, the flange 15 comprises an upper portion 17 extending laterally outward from the top of the side wall 13 and a lower portion 19 foldably connected to the upper portion. In one embodiment, the upper portion 17 has an indentation 21 and the lower portion 19 has an edge 23 that is positioned adjacent to an interior side of the indentation 21. The flange 15 can be referred to as a "rolled flange" in that the lower portion 19 is foldably connected to the upper portion 17 and rolled under the upper portion.

In one embodiment, the bottom wall 11 and side wall 13 form an interior space 25 of the container 3. The food product (not shown) can be placed in the interior space 25 and can be in contact with the bottom wall 11 and the side wall 13, or the food product can be supported by the bottom wall without contact with the side wall.

Figure 2:
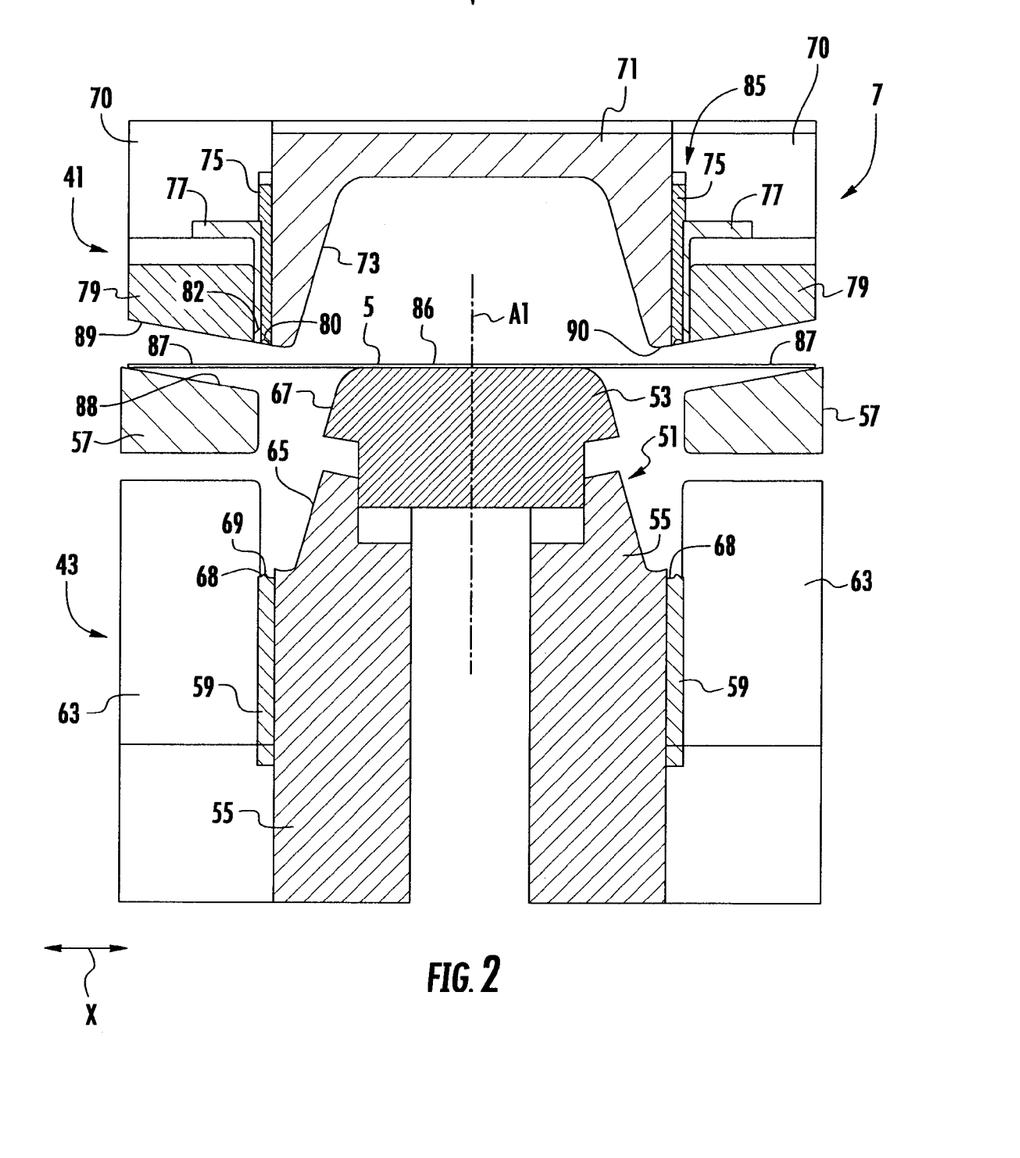
FIG. 2 is a schematic cross-sectional view of the forming tool with a paperboard blank for forming the container of FIG. 1A aligned therewith according to the exemplary embodiment of the disclosure.

FIGS. 2-9A are schematic views of the forming tool 7 in various positions for forming the blank 5 into the container 3. In the illustrated embodiment, the tool 7 includes an upper (first) tool assembly 41 and a lower (second) tool assembly 43. The upper and lower tool assemblies 41 and 43 are independently moveable in the vertical direction Z along a central axis A1 of the assembly to form the blank 5 into the container 3. As shown in FIG. 2, the upper and lower tool assemblies 41, 43 are moved in the vertical direction Z to an open position to form a gap between the assemblies so that a blank 5 traveling in the horizontal direction X is located between the upper and lower tool assemblies prior to the forming process.

In one embodiment, the lower tool assembly 43 has a male forming portion 51 with an articulated nose portion 53 and a base portion 55. The lower tool assembly 43 comprises a draw ring 57 and collar 59 adjacent the base portion 55 and a base 63 of the lower tool assembly. The draw ring 57 and the collar 59 can generally extend around the male forming portion 51 and the central axis A1 of the tool 7. The base portion 55 has an exterior surface 65 that cooperates with an exterior surface 67 of the articulated nose portion 53 to shape the container 3. The collar 59 has forming edge 68 including a protrusion 69 on a top surface thereof and is slidable relative to the base portion 55 and the base 63. The male forming portion 51 and the collar 59 can be otherwise shaped arranged, positioned, and/or configured without departing from the disclosure.

In the illustrated embodiment, the upper tool assembly 41 includes a support 70 and a cavity block 71 having an upper recess 73. The recess 73 can include an external surface having a shape that generally corresponds to the exterior surfaces 65, 67 of the lower tool assembly 43. The upper tool assembly 41 has a first collar 75 adjacent the cavity block 71 and a second collar 77 adjacent to and spaced radially outward from the first collar. The first and second collars 75, 77 can generally extend around the cavity block 71 and the central axis A1 of the tool 7. In one embodiment, the collar 77 is mounted to the support 70. The upper tool assembly 41 has a draw ring 79 adjacent the second collar 77 and generally radially aligned with the draw ring 57 of the lower tool assembly 43. As shown in detail in FIG. 8A, the first collar 75 has forming edge 80 with a curved surface 81 and the second collar 77 has a forming edge 82 with a sloped or curved surface 83. The forming edge 80 of the first collar 75 can be generally aligned with the forming edge 82 of the second collar 77. The edges 80, 82 and the surfaces 81, 83 can be otherwise shaped, without departing from the disclosure. Further the first collar 75, second collar 77, and the cavity block 71 can be otherwise shaped arranged, positioned, and/or configured without departing from the disclosure.

In one embodiment, the collars 59, 75, 77 cooperate to function as flange forming features 85. As shown in FIG. 2, the collar 59 is disposed opposite to the collars 75, 77, and the collars are positionable to form a first portion (e.g. the lower portion 19) of the flange 15, fold the first portion relative a second portion (e.g. the upper portion 17) of the flange, and clamp at least a portion of the flange 15 between the collar 59 and the collars 75, 77. The flange forming features 85 can be otherwise shaped arranged, positioned, and/or configured without departing from the disclosure.

Figure 3:
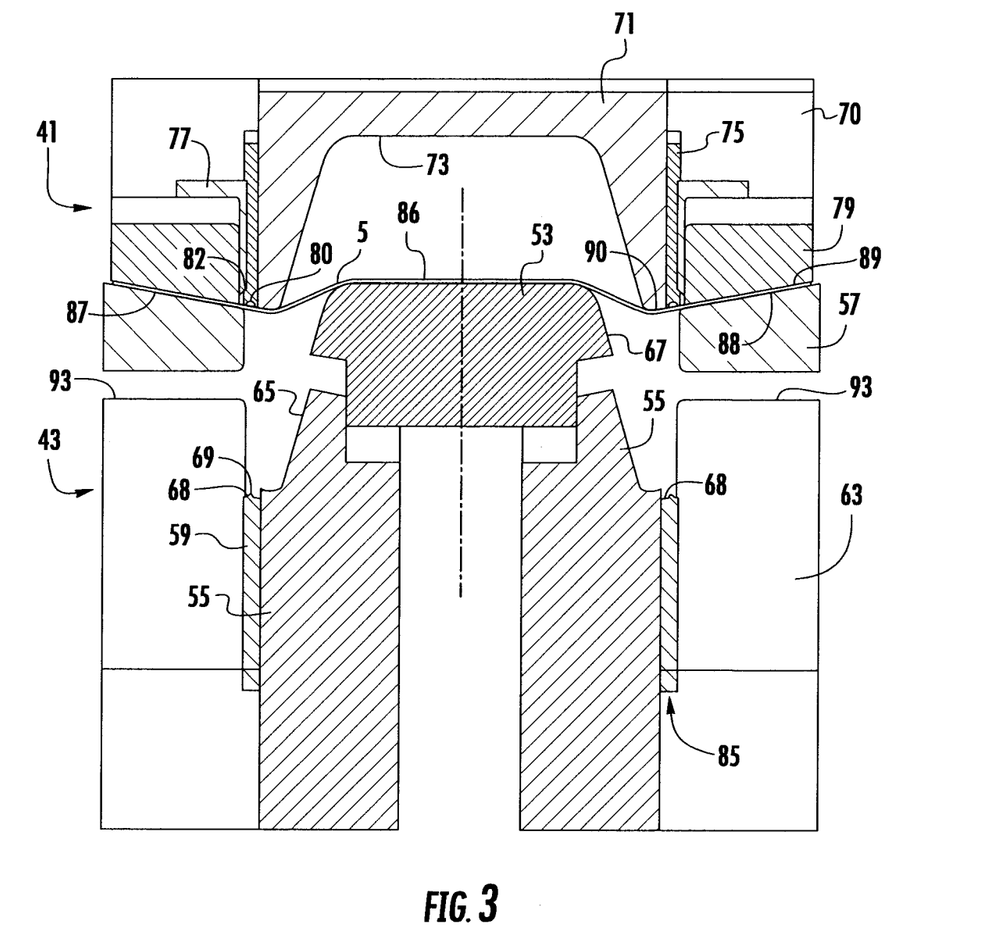
FIGS. 3-5 are schematic cross-sectional views of the forming tool of FIG. 2 showing a lower tool assembly moving toward an upper tool assembly to form a side wall and a bottom wall of the container according to the exemplary embodiment of the disclosure.

A method of forming the container 3 from the blank 5 is described below. The container 3 of the present disclosure is formed from the blank 5 by feeding the blank into the forming tool 7 and operating the tool to press and shape the blank into the container. FIG. 2 shows the open position of the upper and lower tool assemblies 41, 43 with the flat blank 5 centered within the tool assembly 7. The blank is supported on the external surface 67 of the base portion 53 and the draw ring 57 of the lower tool assembly 41. FIG. 3 shows the tool assembly 41 beginning to move to the closed position. In one embodiment, the lower tool assembly 43 can be moved in the Z-direction so that the outer peripheral portion of the blank 5 is held between the draw ring 57 of the lower tool assembly and the draw ring 79 of the upper tool assembly 41. In one embodiment, as the lower tool assembly 43 moves toward the upper tool assembly, the draw ring 57 pushes an outer portion 87 of the blank 5 against the draw ring 79 so that the outer portion 87 is clamped between clamping surfaces 88, 89 of the respective draw rings 57, 79. As shown in FIGS. 2 and 3, the clamping surfaces 88, 89 can be generally sloped upwardly from the interior to the exterior of the tool 7. The slope of the clamping surfaces 88, 89 can be generally aligned with the slope of a bottom surface 90 of the cavity block 71. In the position of FIG. 3, the articulated nose 53 of the lower tool assembly 43 pushes against the center portion 86 of the blank 5 to begin forming the bottom wall 11 and side wall 13 of the container 3.

Figure 4:
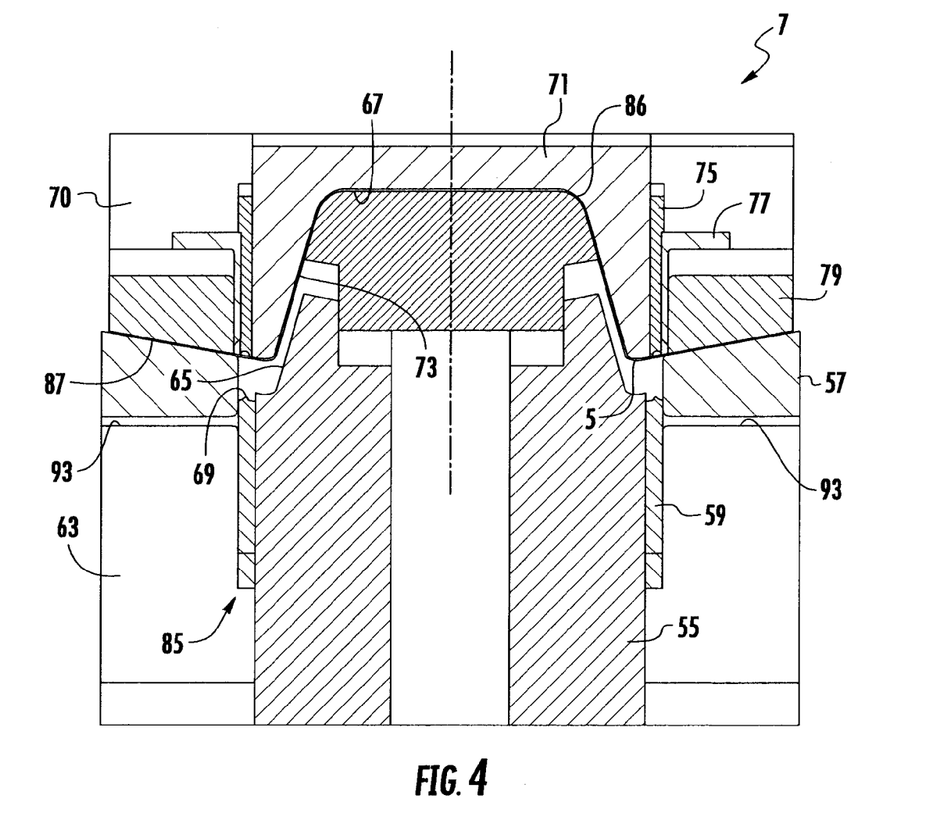

As shown in FIG. 4, the articulated nose 53 further pushes the center portion of the blank 5 upward into the upper recess 73 of the cavity 71. In one embodiment, the articulated nose 53, the base portion 55, and the collar 59 can move together as the articulated nose is pressed into the upper recess 73 so that exterior surface 65 of the base portion and the forming edge 68 of the collar are generally disposed above an upper surface 93 of the base 63. The forming edge 68 of the collar 59 can be adjacent the interior of the draw ring 57. As the male forming portion 51 of the tool assembly is moving into the cavity 71, the draw rings 57, 79 are holding the outer peripheral portion of the blank 5 and the center portion of the blank moves into the cavity.

Figure 5:
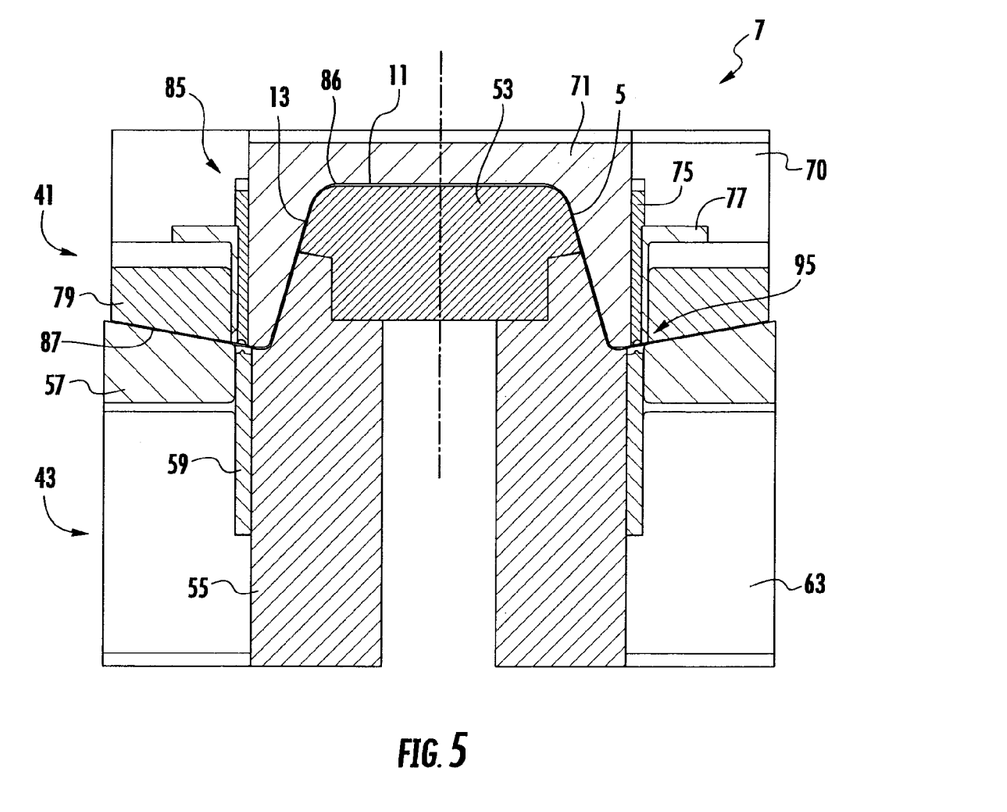

As shown in FIG. 5, the base portion 55 is further raised and urged against the articulated nose 53 so that the external surface 65 contacts the blank 5 and further presses the blank against the upper recess 73 of the cavity block to further form the side wall 13 of the container 3. As the base portion 55 is raised, the draw rings 57, 79 continue to clamp the peripheral portion of the blank. In the illustrated embodiment, the collar 59 is raised together with the base portion 55.

Figure 6:
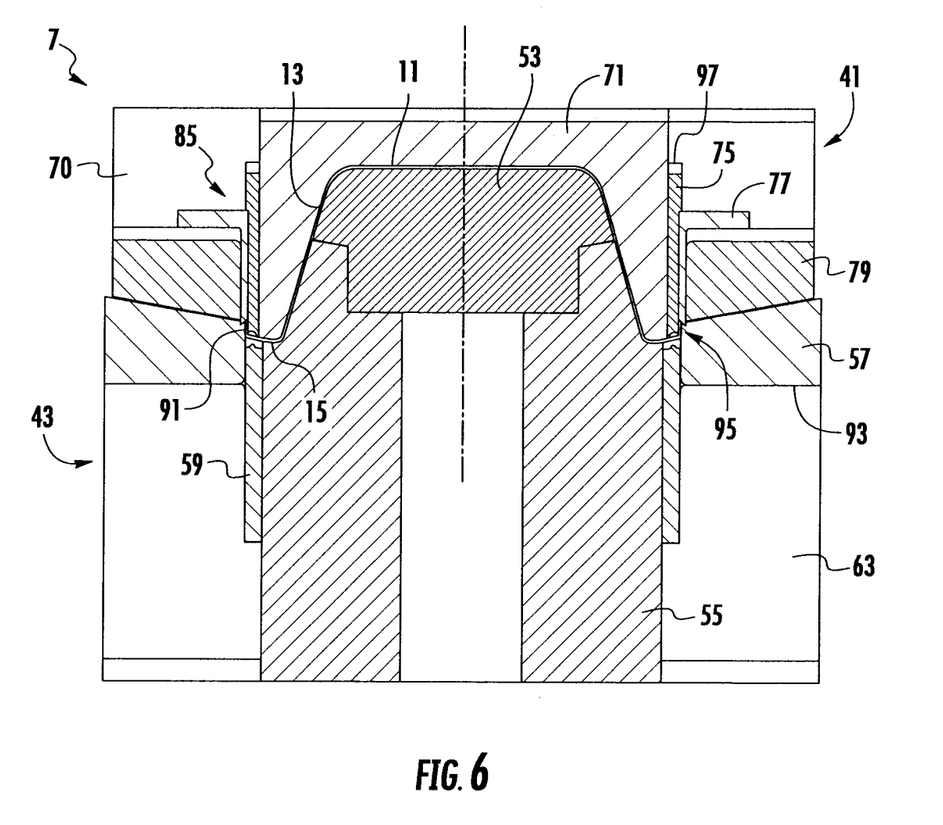
FIGS. 6-9A are schematic cross-sectional views of the forming tool of FIG. 2 showing the formation of a rolled flange of the container with an indentation.

As shown in FIG. 6, the male surfaces 65, 67 of the male forming portion 51 and the surface of the upper recess 73 of the cavity 71 maintain full contact with the inner portion 86 of the blank (e.g., the side wall 13 and the bottom wall 11), thereby clamping the side wall and the bottom wall between the male forming portion 51 and the cavity block 71. The base 63 is moved toward the first tool assembly 41 so that the upper surface 93 contacts the draw ring 57 and the base 63 pushes the draw rings 57, 79 toward the support 70. The draw rings 57, 79 move upwardly relative to the collars 75, 77 and the cavity block 71. Accordingly, an outer peripheral portion of the flange 15 is bent toward the cavity to form a skirt 91 (e.g., the lower portion 19 of the flange 15) around the edge of the flange 15. In the position of FIG. 6, the skirt 91 is adjacent the first collar 75 which is in a lower position relative to the second collar 77, and a free edge of the skirt 91 is adjacent the forming edge 82 of the second collar 77. Particularly, the collar 75 is positioned with the forming edge 80 adjacent and generally aligned with the bottom surface 90 of the cavity block 71. The forming edge 80 is spaced apart from the forming edge 82 of the collar 77 so that a skirt-forming portion 95 is defined by the spaced apart forming edges 80, 82 and the outer surface of the collar 75. Accordingly, the forming edge 80 of the collar 75 restrains the inner portion (e.g., the top portion 17) of the flange 15 while the draw rings 57, 79 pivot the outer portion of the flange 15 relative the inner portion to position the skirt 91 into the skirt-forming portion 95. The skirt 91 could be alternatively formed without departing from the disclosure.

Figure 7:
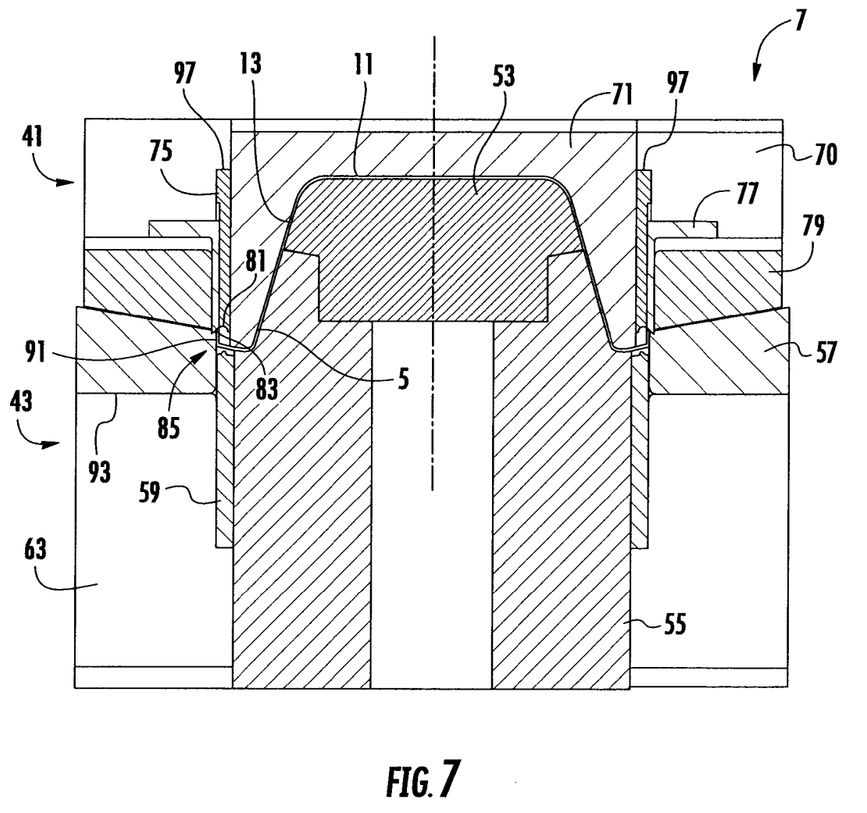

As shown in FIG. 7, the first collar 75 is raised and moved away from a contact position with the flange 15 so that the curved surface 81 of the first collar is adjacent and generally aligned with the curved surface 83 of the second collar 77. The upward movement of the collar 75 can be limited by a collar stop 97 of the support 70. Accordingly, the combined adjacent surfaces 81, 83 of the collars 75, 77 creates a curved surface of the flange forming features 85 for rolling the skirt 91 under the edge of the tray 3 to form the rolled flange 15. To improved the process of rolling the skirt 91, the first and second collars 75, 77 can be made with interlocking segmented vertical grooves.

Figure 8:
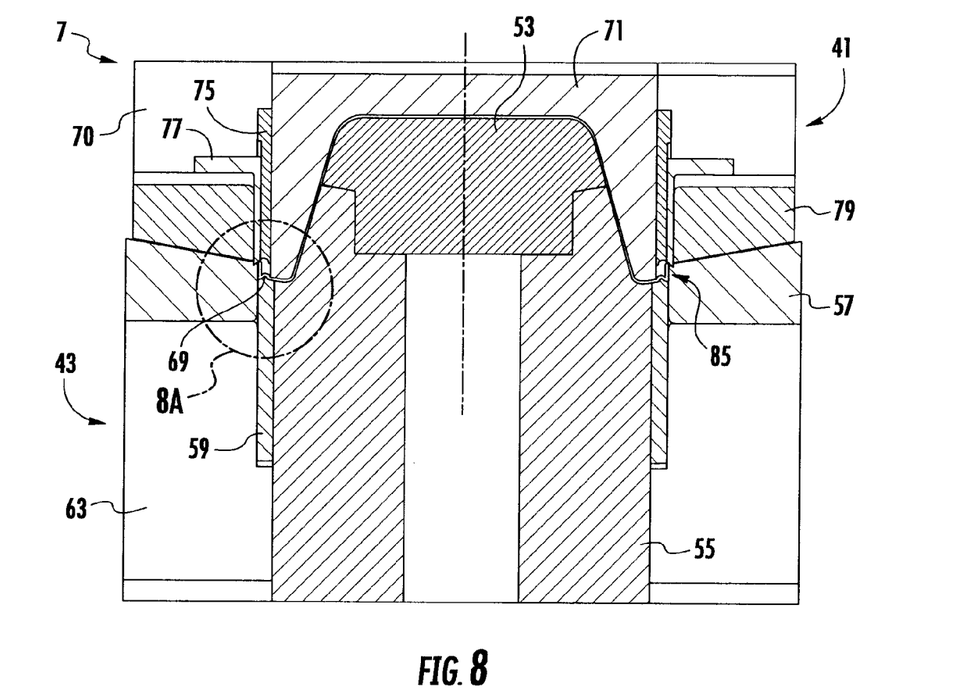
Figure 8A:
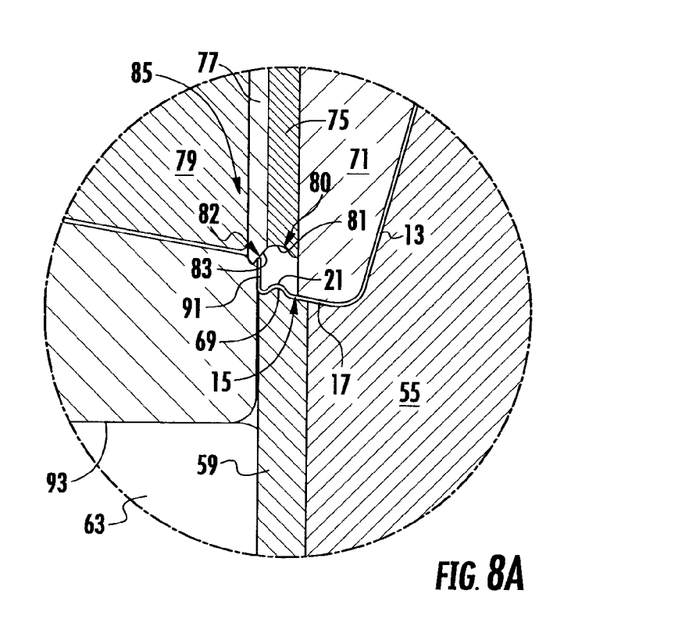

As shown in FIGS. 8 and 8A, the collar 59 of the lower tool assembly 43 is raised to press against the peripheral portion of the blank 5 (e.g., the upper portion 17 of the flange 15). Accordingly, the protrusion 69 of the collar 59 presses against the peripheral portion of the blank 5 to form the indentation 21 in the top portion 17 of the flange 15 of the container 3 (FIG. 1C).

Figure 9:
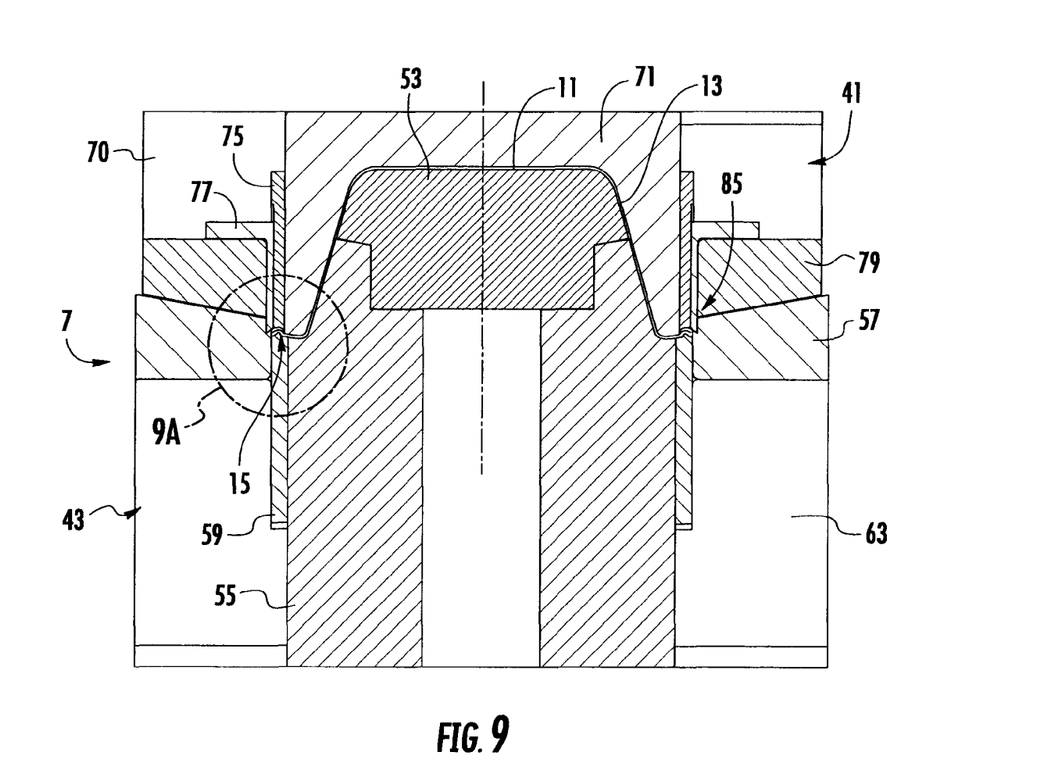
Figure 9A:
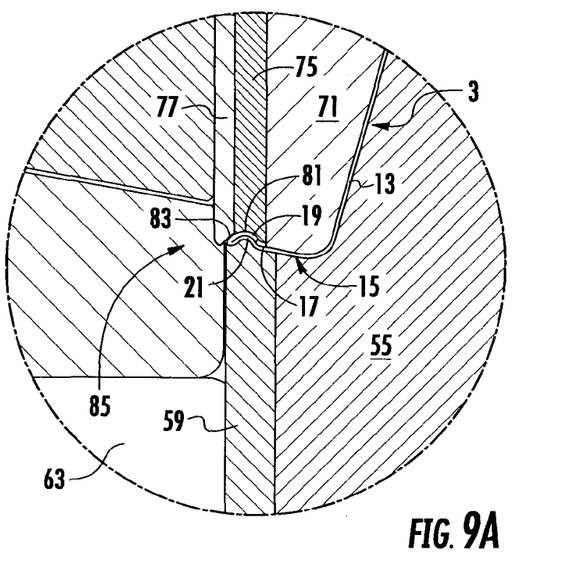

In the illustrated embodiment, the final closing step of the tool 7 is shown in FIGS. 9 and 9A. The lower tool assembly 43 moves toward the upper tool assembly 41 forcing the cavity 71 to move and bottom out against the support 70. Additionally, the base 63 urges the draw rings 79, 57 to move toward the cavity 71 until the draw ring 79 bottoms out against the support 70. The collars 75, 77 remain in the position shown in FIG. 8 with the surfaces 81, 83 forming the rolled flange forming surface. As the draw rings 57, 59 are raised, the draw ring 57 of the lower tool assembly 43 moves into a mating segmented pattern in the outer collar 77. Accordingly, the tool 7 moves the blank 5 upwardly relative the collars 75, 77, and the free edge of the skirt 91 is urged against the curved surface 83 of the outer collar 77 and then against the curved surface 81 of the inner collar 75 until complete closure of the tool 7 occurs. As the edge of the skirt 91 is urged against the forming edges 80, 82, the forming edges fold the skirt 91 toward the upper portion 17 of the flange 15. The flange 15 of the container 3 is now formed with the skirt 91 forming the lower portion 19 of the flange that has been rolled under the upper portion 17 of the flange, and the forming edge 68 of the collar 59 is clamping the upper portion 17 and the lower portion 19 of the flange 15 against the forming edges 80, 82 of the collars 75, 77.

In the illustrated embodiment, the lower tool assembly 43 can move away from the upper tool assembly 41 to open the tool 7 after forming the container 3. The container 3 can be released and ejected or otherwise removed and the tool assemblies 41, 43 can be reset to the position shown in FIG. 2 for receiving another blank 5.

The tool assembly 7 of the present disclosure is configured to allow one tool to perform both the function of forming the bottom wall 11 and side wall 13 of the container 3 and the function of forming the rolled flange 15 of the container. This one step forming process of the present disclosure allows the container 3 to be completely formed by a single tool 7 and eliminates the need for a two-step forming process using multiple tool assemblies. Such integration of the container forming functions into a single tool assembly 7 provides lower tooling costs, reduced waste, and higher manufacturing efficiencies.

The upper tool assembly 41 and lower tool assembly 43 can be commonly mounted in a machine (not shown) of the type manufactured by Peerless Machine & Tool Corporation in Marion, Ind., USA, or any other suitable machine. The machine can provide the primary compressive forces to sufficiently close and open the tool assemblies 41 and 43 of the present disclosure. The closing and opening of the tool assemblies 41, 43 by the machine can form the three-dimensional articles or containers such as the container 3. In other types of machines, the tool assemblies 41, 43 may include minor revisions or modifications to permit the tool assemblies to operate in a variety of alternative orientations form the illustrated embodiment. For example, the first tool assembly 41 can be positioned below the second tool assembly 43 without departing from the disclosure. Also, the tool assemblies 41, 43 can be positioned at an angle relative to vertical axis A1 shown without departing from the disclosure. It should be understood that the operating position and/or sequence of the tool assemblies 41 and 43 shown and/or described herein is not intended to limit the scope of the disclosure.

The foregoing description of the disclosure illustrates and describes various embodiments of the present disclosure. As various changes could be made in the above construction without departing from the scope of the disclosure, it is intended that all matter contained in the above description or shown in the accompanying drawings shall be interpreted as illustrative and not in a limiting sense. Furthermore, the scope of the present disclosure covers various modifications, combinations, and alterations, etc., of the above-described embodiments that are within the scope of the claims. Additionally, the disclosure shows and describes only selected embodiments of the invention, but the invention is capable of use in various other combinations, modifications, and environments and is capable of changes or modifications within the scope of the inventive concept as expressed herein, commensurate with the above teachings, and/or within the skill or knowledge of the relevant art. Furthermore, certain features and characteristics of each embodiment may be selectively interchanged and applied to other illustrated and non-illustrated embodiments of the disclosure without departing from the scope of the disclosure.

What is claimed is:

1. A tool for forming a container from a blank, the container having a flange, the tool comprising:
   a first tool assembly; and
   a second tool assembly;
   at least one of the first tool assembly and the second tool assembly being moveable between an open position, wherein the blank is received between the first tool assembly and the second tool assembly, and a closed position wherein the blank is formed into the container;
   at least one of the first tool assembly and the second tool assembly comprising flange forming features for forming the flange of the container whereby a first portion of the flange is folded with respect to a second portion of the flange, and the first portion of the flange comprises a free edge of the blank; and
   wherein the flange forming features comprise a first collar, a second collar and a third collar each extending at least partially around a central axis of the tool, the first collar comprising a first forming edge having a first curved surface, the second collar comprising a second forming edge having a second curved surface, and the third collar comprising a third forming edge, the first forming edge, the second forming edge, and the third forming edge each are for at least partially forming the flange of the container, the first curved surface and the second curved surface are aligned to form a flange forming surface, the flange forming surface engages the free edge of the first portion of the flange and contacts the free edge to fold the first portion of the flange toward the second portion of the flange when the tool is moved from the open position to the closed position, and the third collar is disposed opposite to the first collar and the second collar, and the third forming edge is for clamping the second portion of the flange and the first portion of the flange including the free edge of the blank between the flange forming surface and the third forming edge at the closed position of the tool.

2. The tool of claim 1, wherein the third forming edge of the third collar comprises a protrusion extending at least partially around the central axis of the tool, the protrusion being for forming an indentation in at least one of the first portion and the second portion of the flange of the container.

3. The tool of claim 1, wherein:
the second collar extending at least partially around the first collar; and
the first collar and the second collar are movable with respect to one another.

4. The tool of claim 3, wherein the first collar is positionable so that the first forming edge is spaced apart from the second forming edge and the second forming edge is disposed adjacent an outer surface of the first collar, the flange forming features comprise a skirt-forming portion defined along the outer surface of the first collar between the spaced apart first forming edge and second forming edge, and the skirt-forming portion is for forming the first portion of the flange prior to folding the first portion of the flange toward the second portion of the flange.

5. The tool of claim 4, wherein the first tool assembly comprises a first draw ring and the second tool assembly comprises a second draw ring, the first draw ring and the second draw ring extending at least partially around the central axis of the tool outwardly of the first collar and the second collar, and the first draw ring and the second draw ring are for clamping an outer portion of the blank therebetween.

6. The tool of claim 5, wherein the first draw ring and the second draw ring are movable relative to the first collar and the second collar for folding a portion of the flange into the skirt-forming portion.

7. The tool of claim 1, wherein the first tool assembly comprises a cavity block and the second tool assembly comprises a male forming portion, the male forming portion being for cooperating with the cavity block to at least partially form a side wall of the container.

8. The tool of claim 7, wherein the cavity block defines a recess and the male forming portion comprises an articulated nose and a base portion, the articulated nose being movable with respect to the base portion, the articulated nose and the base portion respectively comprising a first surface and a second surface, and the first surface and the second surface are for cooperatively pressing at least a portion of the blank into the recess and against the cavity block.

9. The tool of claim 8, wherein the second tool assembly comprises the third collar, the third collar extends at least partially around the base portion and is movable with respect to the base portion, and the third forming edge of the third collar comprises a protrusion for forming an indentation in at least one of the first portion and the second portion of the flange of the container.

10. The tool of claim 8, wherein:
the first tool assembly comprises the first collar and the second collar, each extending at least partially around the cavity block;
the first collar, the second collar, and the cavity block are movable with respect to one another; and
the first collar and the second collar cooperate to at least partially form the first portion of the flange and to fold the first portion toward the second portion of the flange.

11. A method of forming a container from a blank, the method comprising:
obtaining a tool and the blank, the tool comprising a first tool assembly and a second tool assembly, at least one of the first tool assembly and the second tool assembly comprising flange forming features for forming a flange of the container, the flange forming features comprise a first collar, a second collar, and a third collar each extending at least partially around a central axis of the tool, the first collar comprising a first forming edge having a first curved surface, the second collar comprising a second forming edge having a second curved surface, and the third collar comprising a third forming edge, the blank comprises a first portion and a second portion that form the flange of the container, the first portion of the blank comprises a free edge of the blank;
pressing the blank between the first tool assembly and the second tool assembly to form the blank into the container having an interior by moving the tool between an open position, wherein the blank is received between the first tool assembly and the second tool assembly, and a closed position wherein the blank is formed into the container;
positioning the first collar to align the first curved surface of the first forming edge with the second curved surface of the second forming edge to form a flange forming surface; and
moving the blank to engage the free edge of the first portion with the flange forming surface, the contact of the free edge with the flange forming surface folds the first portion toward the second portion to form the flange when the tool is moved between the open position and the closed position, and clamping the second portion and the first portion including the free edge of the blank between the third forming edge and the flange forming surface at the closed position of the tool.

12. The method of claim 11, wherein the third forming edge of the third collar comprises a protrusion extending at least partially around the central axis of the tool, and the clamping the second portion and the first portion between the third forming edge and the flange forming surface comprises pressing the protrusion against the flange to form an indentation in at least one of the first portion and the second portion.

13. The method of claim 11, wherein:
the second collar extends at least partially around the first collar.

14. The method of claim 13, further comprises
positioning the first collar with the first forming edge adjacent the flange, wherein the second forming edge is spaced apart from the flange and the first forming edge, and the second forming edge is adjacent an outer surface of the first collar; and pivoting the first portion relative to the second portion and positioning at least a portion of the first portion against the outer surface of the first collar so that the free edge extends adjacent the second forming edge of the second collar.

15. The method of claim 14, wherein:

the first tool assembly comprises a first draw ring and the second tool assembly comprises a second draw ring, the first draw ring and the second draw ring extending at least partially around the central axis of the tool outwardly of the first collar and the second collar;

the pressing the blank between the first tool assembly and the second tool assembly comprises positioning the blank between the first tool assembly and the second tool assembly and clamping an outer portion of the blank between the first draw ring and the second draw ring; and the pivoting the first portion comprises moving the first draw ring and the second draw ring relative to the first collar and the second collar to pivot the first portion while the first collar at least partially restrains the second portion.

16. The method of claim 11, wherein the first tool assembly comprises a cavity block and the second tool assembly comprises a male forming portion, and the pressing the blank between the first tool assembly and the second tool assembly comprises clamping an inner portion of the blank between the cavity block and the male forming portion to at least partially form a side wall of the container.

17. The method of claim 16, wherein:

the cavity block defines a recess and the male forming portion comprises an articulated nose and a base portion; and the clamping the inner portion of the blank comprises moving at least the articulated nose toward the cavity block to press at least a portion of the inner portion of the blank into the recess.

18. The method of claim 17, wherein the clamping the inner portion of the blank further comprises moving the base portion toward the cavity block and the articulated nose to press at least a portion of the inner portion of the blank into the recess so that a side wall and a bottom wall of the container are formed between an external surface of the recess and an exterior surface of the articulated nose and the base portion.

19. The tool of claim 1, wherein the first portion of the flange is in contact with the first curved surface and the second curved surface when the second portion of the flange and the first portion of the flange are clamped between the flange forming surface and the third forming edge.

20. The tool of claim 19, wherein the second portion of the flange contacts the third forming edge when the second portion of the flange and the first portion of the flange are clamped between the flange forming surface and the third forming edge.

21. The method of claim 11, wherein the first portion is in contact with the first curved surface and the second curved surface when the second portion and the first portion are clamped between the flange forming surface and the third forming edge.

22. The method of claim 21, wherein the second portion contacts the third forming edge when the second portion and the first portion are clamped between the flange forming surface and the third forming edge.

* * * * *